United States Patent [19]

Conforti

[11] Patent Number: 4,672,603
[45] Date of Patent: Jun. 9, 1987

[54] COMBINED ANALOG/DIGITAL CCIS DATA TRANSMITTER/RECEIVER CIRCUIT

[75] Inventor: Joseph A. Conforti, Phoenix, Ariz.

[73] Assignee: GTE Communication Systems Corporation, Phoenix, Ariz.

[21] Appl. No.: 803,696

[22] Filed: Dec. 2, 1985

[51] Int. Cl.$^4$ ............................................... H04J 3/12
[52] U.S. Cl. .................................. 370/58; 370/110.1; 379/230
[58] Field of Search ................... 370/58, 110.1, 85; 179/18 ES

[56] References Cited

U.S. PATENT DOCUMENTS

| 4,464,748 | 8/1984 | Krikor | 370/58 |
| 4,466,062 | 8/1984 | Krikor | 179/18 ES |
| 4,488,004 | 12/1984 | Bogart et al. | 179/18 ES |
| 4,499,336 | 2/1985 | Krikor et al. | 179/18 ES |

Primary Examiner—Douglas W. Olms
Assistant Examiner—Kenneth I. Rokoff
Attorney, Agent, or Firm—Frank J. Bogacz; Peter Xiarhos

[57] ABSTRACT

Common channel interoffice data transfer circuitry is shown for transmitting and receiving both analog and digital CCIS data. This data transfer circuitry is a data terminal equipment control circuit. The terminal equipment control circuit is microprocessor controlled. The terminal equipment control circuit is adaptable to transfer CCIS data to analog interfaces, such as modems. The circuit is also adaptable to transfer CCIS data to and from digital data sources, such as digital trunks or T1 spans. The design of this circuit possesses a high degree of commonality and, therefore, requires a minimal amount of components.

18 Claims, 2 Drawing Figures

COMBINED ANALOG/DIGITAL CCIS DATA TRANSMITTER/RECEIVER CIRCUIT

BACKGROUND OF THE INVENTION

The present invention pertains to analog and digital CCIS data transmission and more particularly to terminal equipment control circuitry adaptable for use with modems and digital trunks.

Various kinds of terminal equipment may be employed to transmit CCIS data between switching offices. This terminal equipment may include modems, digital trunks or T1 spans. Typically, different terminal equipment control circuits were designed to control one particular kind of terminal equipment. Problems associated with this design or lack of commonality and excessive real time usage of the associated CPU.

One method of alleviating the real time problem of the CPU is to build a separate terminal equipment control circuit for each type of terminal equipment being operated. This is wasteful in design and also in the amount of space and components required to assemble such circuitry. Commonality of circuitry is, therefore, highly desirable.

One CCIS circuit arrangement possessing a degree of commonality is taught by U.S. Pat. No. 4,464,748 issued on Aug. 7, 1984, to K. A. Krikor. The assignee of the present application is the successor and all right, title and interest to the assignee of the above mentioned U.S. patent.

Accordingly, it is an object of the present invention to provide common circuitry for analog and digital CCIS data transmission and reception.

SUMMARY OF THE INVENTION

A CCIS system has a plurality of terminal equipment control circuits. Each terminal equipment control circuit operates to transmit and receive CCIS data words in analog and digital form. Each terminal equipment control circuit is connected between a CCIS system CPU and digital and analog terminal equipment.

Each terminal equipment control circuit includes a CPU, a clock, a data bus, a bus controller, a mode controller, a receiver and a transmitter. The bus controller is connected between the CPU and the bus. The bus controller operates in response to the CPU to transfer CCIS data words to and from the CPU.

The mode controller is connected to the bus and operates in response to the CPU to store a number of indicators. The indicators include a receive or transmit mode indicator and an analog or digital mode indicator.

The receiver is connected to the clock, the mode controller, the analog and digital terminal equipment and the CPU via the bus. The receiver operates in response to the clock to transfer the CCIS data words from the analog or digital terminal equipment to the CPU.

The transmitter is connected to the CPU via the bus, the clock, the mode controller and the analog and digital terminal equipment. The transmitter is operated in response to the clock to transfer CCIS data words from the CPU to the analog and digital terminal equipment.

A BRIEF DESCRIPTION OF THE DRAWINGS

DESCRIPTION OF THE PREFERRED EMBODIMENT

Figure 1:
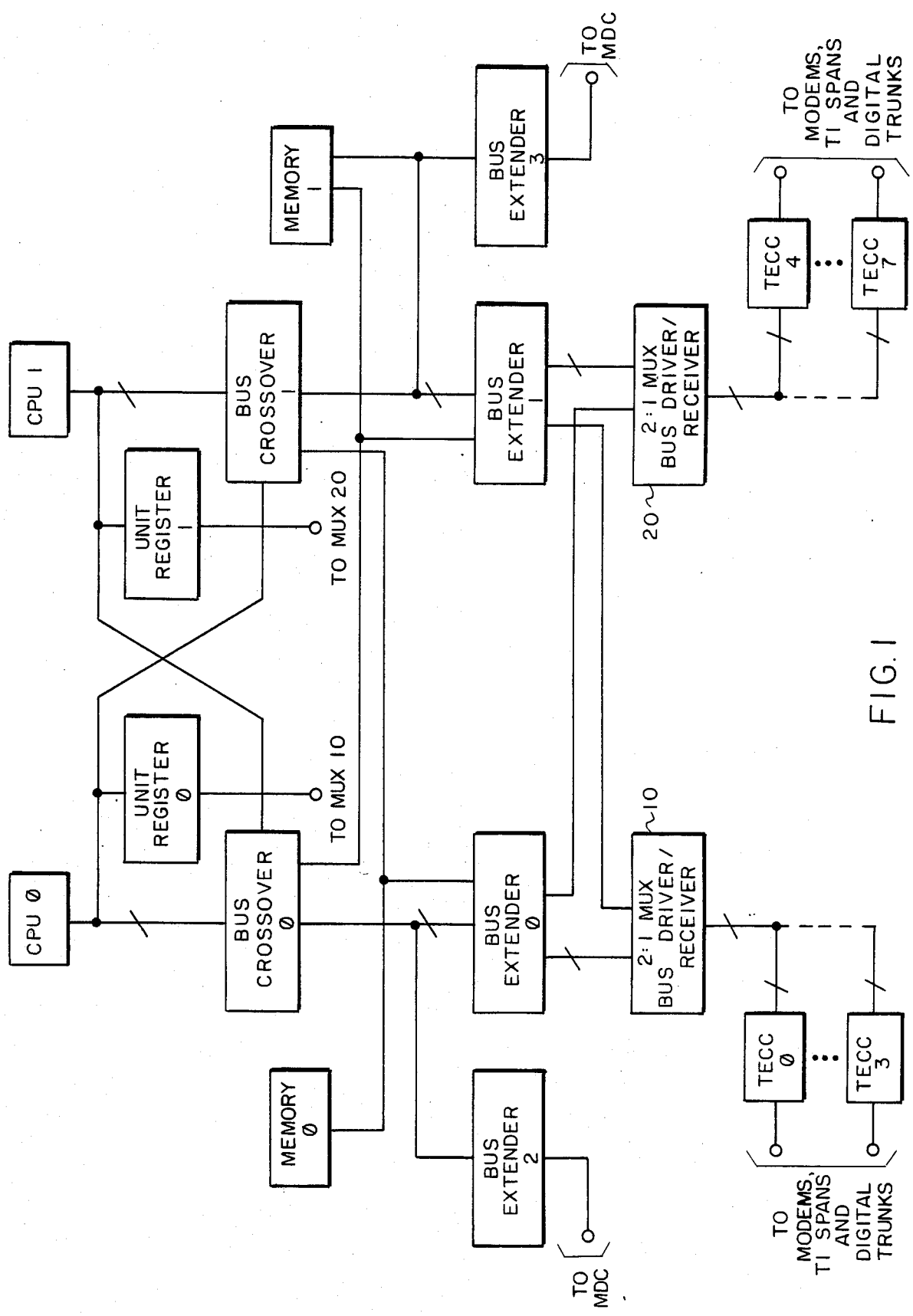
FIG. 1 is a block diagram of a Common Channel Interoffice Signaling system.

Referring to FIG. 1, a CCIS data link sub-system of a central switching office is shown. The control circuitry of the data link sub-system includes two Intel 8086 microprocessors, CPU0 and CPU1. Intel is a registered trademark of the Intel Corporation. Only one of these processors is active at a particular time. The other processor is a backup processor which operates upon detection of a fault in the active processor. The backup processor is a "hot" standby processor which runs self-diagnostics until such time as it becomes active and the other becomes standby.

Each CPU functions to collect data received or transmitted to or from analog and digital sources, such as modems and T1 spans or digital trunk units. This data is collected and analyzed and retransmitted to another processor group. CPU0 and 1 are respectively connected to the bus extender units 0 and 1, which function to provide for a multiplicity of connections to each CPU's address and data buses. Connected between each CPU and bus extender is a corresponding bus cross-over network which provides the ability to operate circuitry of one portion of the CCIS sub-system with the CPU of the opposite portion of the sub-system. For example, bus extender 0 may be operated by CPU1. In addition, each CPU has a corresponding memory connected via the bus cross-over circuit. This memory contains the instruction and data stores necessary to operate each CPU for data collection, analysis and transfer.

Each bus extender circuit is connected to two multiplexer units 10 and 20. Each multiplexer unit may handle up to four sources of digital or analog information input. The two multiplexing units 10 and 20 may be operated by either CPU. Each CPU may handle a total of eight sources of data input/output.

CPU0 and CPU1 are respectively connected to unit register 0 and 1. Unit registers 0 and 1 are connected to multiplexers 10 and 20 respectively. The unit registers are operated under the CPU's instructions to select which particular transmission source is connected to multiplexers 10 and 20 for the collection or transmission of data by the corresponding CPU.

Each source is connected to the CPUs through its corresponding multiplexer by a terminal equipment control circuit (TECC 0-3, 4-7). The TECCs serve to control the particular data terminal equipment device such as a modem (analog 2400 bits per second or digital 4000 bits per second) and may be implemented with an Intel 8085 microprocessor and associated logic.

FIG. 1 represents a CCIS configuration for a particular telephone central office. CCIS data includes trunk signaling and supervision data from voice trunks. CCIS data is transmitted and received in 28-bit bursts. The 28-bits of data includes 20-bits of CCIS data and 8-bits of CRC (Cyclic Redundancy Check) information. Instead of transmitting this data in a conventional manner over the trunk itself, the signaling data is sent via a data link arrangement between two CCIS telephone central offices. This results in more efficient use of the trunks than otherwise would be possible. Each CCIS sub-system may both transmit and receive data from another CCIS sub-system of another central office.

Two groups of terminal equipment control circuits (TECCs) are shown in FIG. 1. A first group of 4 terminal equipment control circuits (TECC0-TECC3) is connected between 2 to 1 multiplexer bus driver/receiver 10 and the terminal equipment such as modems, T1 spans and digital trunks. A second group of terminal equipment control circuits TECC4-TECC7 is connected between another set of terminal equipment and 2 to 1 multiplexer bus driver/receiver 20. Each TECC operates to control its corresponding terminal equipment and each TECC includes a processor and associated memory. This processor may include a CPU such as an Intel 8085 microprocessor.

The CPU of each TECC may be programmed to operate modems in an analog mode of transmission at various rates between 110 and 2400 bits per second. This CPU may also operate T1 spans and digital trunks by performing such functions as error detection, error correction, synchronization, recovery and diagnostic functions, reformatting and prioritizing of CCIS data.

When the active CPU (CPU0 or CPU1) of the CCIS sub-system determines that incoming CCIS data has been received by a TECC or that outgoing CCIS data is to be transmitted to a particular TECC, data is transmitted or received directly between the active CPU and a particular TECC with its CPU and associated memory. The active CPU will directly read or write the memory of the particular TECC. The read or write corresponds to receiving or transmitting CCIS data from or to the connected TECC.

Since no intermediate buffering exists, the data transfer arrangement between the active CPU and the particular TECC's CPU is much more reliable. In addition, less components dictates the need for less diagnostic system software. The direct reading and writing of the TECC's memory eliminates the need for any intermediate buffering and the associated CPUs' real time overhead. As a result, the real time operation of both processors are improved. Due to the direct data transfer between CPUs and despite other switching system limitations, the TECCs may operate the corresponding terminal equipment at nearly a 100 percent duty cycle.

Figure 2:
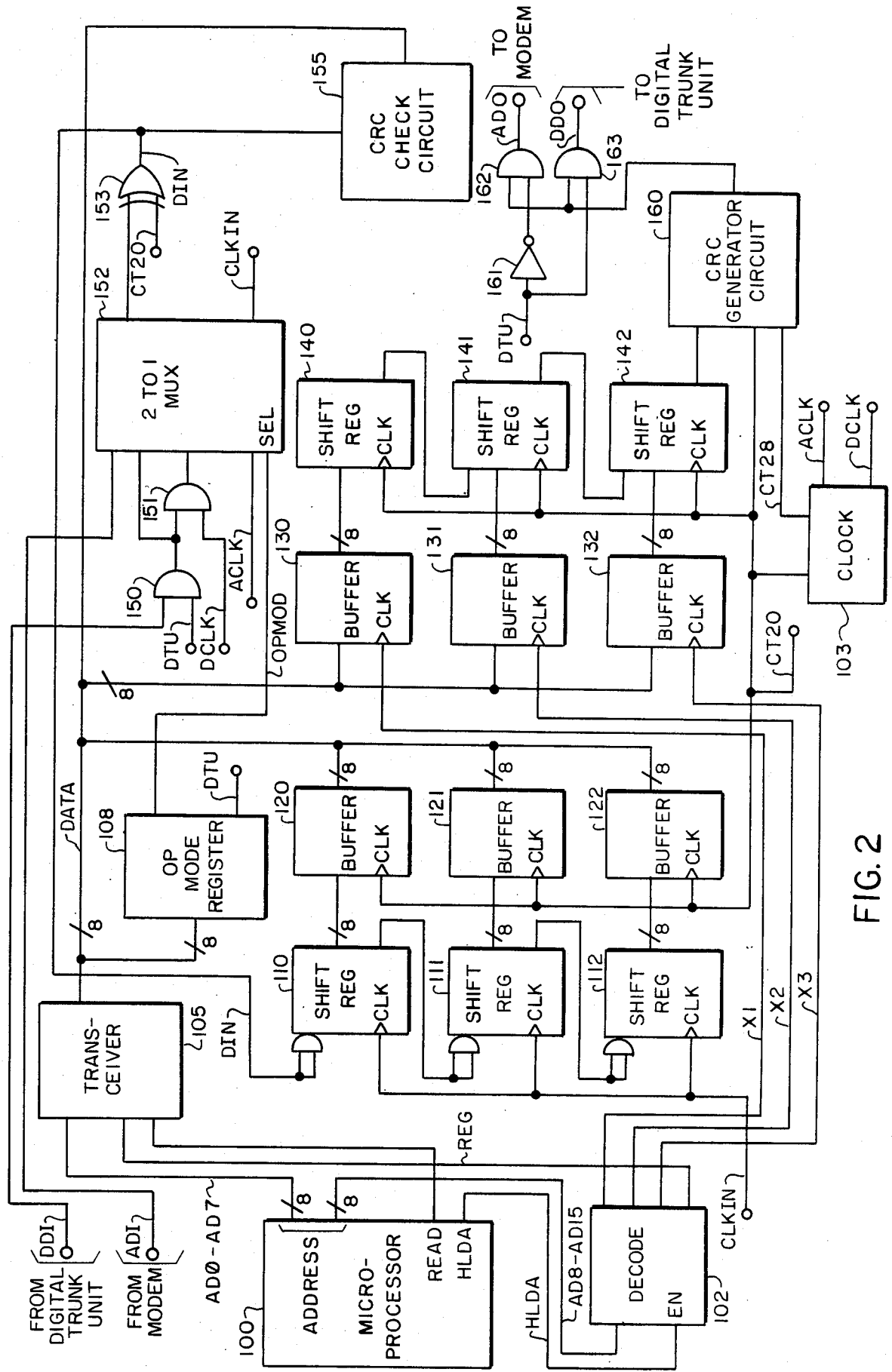
FIG. 2 is a schematic diagram of the terminal equipment control circuit for combined analog and digital transmission reception.

FIG. 2 depicts the digital and analog receive and transmit portions of a terminal equipment control circuit (TECC). The TECC microprocessor 100 controls operation of all TECC functions. A digital trunk unit or a modem may be plugged directly into each TECC. Microprocessor 100 is programmed to handle either type of transmission. In addition, the circuitry utilizes common elements, as much as possible, to perform data transmission and reception for digital and analog data.

Digital data is received on the DDI lead from a digital source, such as a digital trunk unit. Analog data is received on the ADI lead from an analog source such as a modem. Analog data for transmission to another system is transmitted via the ADO lead to a modem. And, digital data for transmission to another CCIS system is transmitted via the DDO lead to a digital trunk unit.

Microprocessor 100 is connected to transceiver 105 via the low order 8-bits of the microprocessor address bus (AD0-AD7). Microprocessor 100 is also connected to decode logic 102 via the high order 8-bits of the address bus (AD8-AD15) and the HOLD acknowledge lead (HLDA). When the microprocessor 100 accesses the transmit and receive logic, it accesses the logic shown in FIG. 2 as if it were extended memory. To accomplish this, the microprocessor is put into a hold state by circuitry (not shown). As a result of this hold request, the HLDA lead enables decoder 102 and provides the REG signal. Decode logic 102 is connected to transceiver 105 via the REG lead. This signal enables transceiver 105 to connect the transmit and receive logic which is located on the DATA bus to the microprocessor 100 via the microprocessor's data bus. The microprocessor's data bus is multiplexed with the low order 8-bits of its address bus. The REG lead controls enabling transceiver 105 to connect the DATA bus of the transmit and receive logic to the microprocessors 100 data bus.

Microprocessor 100 is also connected to transceiver 105 via the READ lead. The value of the READ signal controls the direction of flow of data through transceiver 105. For READ value of logic 1, transceiver 105 enables data to be sent from the microprocessor onto the DATA bus. For a read value of logic 0, transceiver 105 enables data to flow from the DATA bus into the microprocessor.

OP MODE register 108 is connected to the DATA bus. When this register is addressed by the microprocessor, several values are stored in register 108 to indicate the mode of operation of the transmit/receive logic.

Clock 103 produces all the analog and digital clock signals for the transmit and receive logic. In addition, clock 103 produces the counting signals required to transmit CCIS data. Clock 103 is connected to 2 to 1 multiplexer 152 via the ACLK lead (analog clock). Clock 103 is connected to AND gate 151 via the DCLK lead (digital clock). Clock 103 is connected to CRC (Cyclic Redundancy Check) generator circuit 160 via the CT28 lead. In addition, clock 103 is connected via the CT20 lead to the clock input of buffers 120-122, the clock input of buffers 140-142 and to CRC generator circuit 160.

Buffers 120, 121 and 122 are connected to the DATA bus. Shift register 110 is connected to buffer 120; shift register 111 is connected to buffer 121; and shift register 112 is connected to buffer 122. Shift registers 110 through 112 and buffers 120 through 122 are each 8-bit wide devices. The output of shift register 110 is connected to the input of shift register 111; and, the output shift register 111 is connected to the input of shift register 112. Collectively, shift registers 110 through 112 form a 24-bit wide word in which to hold CCIS data. Shift registers 110-112 and buffers 120-122 comprise a portion of the receive logic of the TECC.

The transmit logic of the TECC circuitry comprises in part buffers 130 through 132 and shift registers 140 through 142. Buffers 130 through 132 are each connected to the DATA bus. In addition, buffers 130 through 132 are each connected to decode logic 102. Decode logic is connected to buffer 130 via the X1 lead; to buffer 131 via the X2 lead; and, to buffer 132 via the X3 lead.

Buffer 130 is connected to shift register 140; buffer 131 is connected to shift register 141; and, buffer 132 is connected to shift register 142. Each of these connections is a 8-bits wide. The output of shift register 140 is connected to the input of shift register 141 and, the output of shift register 141 is connected to the input of shift register 142. The output of shift register 142 is connected to CRC generator circuit 160.

For analog or digital data transmission from the TECC, CRC generator circuit 160 is connected to AND gates 162 and 163. OP MODE register 108 is connected to inverter 161 and to AND gate 163 via the DTU lead. The output of inverter 161 is connected to AND gate 162. Analog data output is produced on the ADO lead, which is the output of gate 162. Digital data is produced on the DDO lead, which is the output of gate 163.

For data reception by the TECC, digital data from the digital trunk unit is connected to AND gate 150 via the DDI lead. Analog data from a modem is connected via the ADI lead to multiplexer 152. OP MODE register 108 is connected to AND gate 150 via the DTU lead. Gate 150 is connected to AND gate 151 and to multiplexer 152. OP mode register 108 is connected to the select input of multiplexer 152.

Multiplexer 152 is connected to the clock input of shift registers 110 through 112 via the CLKIN lead. In addition, the data output of multiplexer 152 is connected to EXCLUSIVE-OR gate 153. Clock 103 is connected via the CT20 lead to EXCLUSIVE-OR gate 153. CRC check circuit 155 is connected between EXCLUSIVE-OR gate 153 and the DATA bus. The data selected for input is connected to shift register 110 via the DIN lead.

For receiving CCIS data from a modem or digital trunk unit, microprocessor 100 operates transceiver 105 via the REG lead. Microprocessor 100 then writes control information via transceiver 105 into the OP MODE register 108. This information contains an indication of whether the CCIS data is being transmitted or received and an indication of whether the form of the transmission is digital or analog.

If the operation mode was analog, for example, multiplexer 152 would be operated in response to the OPMOD signal to transmit the analog clock signal via the CLKIN lead to shift registers 110 through 112. In addition, multiplexer 152 would be operated to transmit the analog data to shift register 110 via the DIN lead. Since each CCIS data burst is 28-bits in length, the first 20-bits which contain the CCIS information are shifted into shift registers 110 through 112. After 20-bits have been received by shift registers 110 through 112, clock 103 operates buffers 120 through 122 via the CT20 lead to extract the 20 data bits of CCIS information from shift registers 110 through 112 and store them in buffers 120 to 122. The next 8-bits which contain the CRC information are then transmitted to CRC check circuit 155 for comparison with the CRC information which it has calculated from the incoming data. If an error is encountered, the type and nature of the error is transmitted to microprocessor 100 via the DATA bus.

When the 20-bits of CCIS information have been collected and stored in buffers 120 through 122, microprocessor 100 then selects transceiver 105 for a read operation. Microprocessor 100 then sequentially reads the CCIS data from buffers 120, 121 and 122.

For receiving digital data from a digital trunk unit, the DTU signal of OP MODE register 108 would be set to indicate digital data. AND gate 150 operates in response to the DTU signal to gate the digital data through to multiplexer 152. In addition, AND gate 151 is operated to gate the digital clock signal DCLK to multiplexer 152. Since the OPMOD signal has been set to indicate the data receiving mode, multiplexer 152 now transmits the digital data via the DIN lead and EXCLUSIVE-OR gate 153. In addition, multiplexer 152 transmits the digital clock via the CLKIN lead to shift registers 110 through 112. The further operation of the shift registers, buffers and the microprocessor is the same as that described above for receiving analog data.

For transmitting analog or digital data, microprocessor 100 enables transceiver 105. Next, microprocessor 100 writes OP MODE register 108 to indicate that a transmit operation is taking place and whether the transmission is digital or analog. Next, microprocessor 100 must transmit the outgoing CCIS data. Microprocessor 100 addresses buffers 130 through 132 sequentially as memory.

When a particular address corresponding to a particular buffer is decoded by decode logic 102, the signals X1, X2 or X3 are generated. The X1 signal operates to allow the microprocessor, 100 to write 8-bits of the CCIS data into buffer 130. Buffer 131 is operated in response to the X2 signal to receive and store another 8-bits of CCIS data. Similarly, buffer 132 is operated in response to the X3 signal to store another 8-bits of CCIS data. Since a CCIS data transmission contains only 20-bits of CCIS data the 4 high order bits of buffer 130 are written with information which is a don't care function. These 4-bits are not trnasmitted.

After buffers 130 through 132 have been written with CCIS data. This data is transferred from buffers 130-132 to shift registers 140-142. Shift registers 140-142 are then clocked via the CT20 lead to shift out 1-bit serially to CRC generator circuit 160. After shift register 140-142 have been clocked 20 times via the CT20 signal, all CCIS information has been transmitted from the shift registers 140-142 and the shift registers are no longer clocked by the CT20 signal.

The CRC generator circuit 160 has been operating to transmit the first 20-bits of CCIS information directly through to AND gates 162 and 163. Then, the CRC generator circuit is operated in response to the CT28 signal to transmit 8-bits of CRC information to AND gates 162 and 163. CRC generator circuit 160 has calculated the CRC information based upon the value of each bit of CCIS data which it has transmitted. CRC generator circuit 160 then transmits the 8-bits of CRC information which it has calculated.

If microprocessor 100 had set the digital mode of operation indicator in OP MODE register 108, the DTU signal will enable AND gate 163 to transmit the 20-bits of CCIS data plus the 8-bits of CRC information on the DDO lead to a digital trunk unit. If the analog mode of operation had been set by microprocessor 100, inverter 262 will enable AND gate 162 to transmit the CCIS data word to a modem via the ADO lead.

Buffers 130-132 may be implemented with integrated circuit part number 74LS279. Buffers 120-122 may be implemented with integrated circuit part number 74LS374. Shift registers 110-112 may be implemented with integrated circuit part number 74LS164 Shift registers 140-142 may be implemented with integrated circuit part number 74LS166.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a CCIS system, a plurality of terminal equipment control circuit for transmitting and receiving CCIS data words in analog and digital form, each said terminal equipment control circuit connected between a CCIS system CPU and digital and analog terminal equipment, each said terminal equipment control circuit comprising:

CPU means;
clock means;
bus means for transferring said CCIS data words;
bus control means connected between said CPU means and said bus means, said bus control means being operated in response to said CPU means to control the transfer of said CCIS data words to and from said CPU means;
mode control means connected to said bus means and being operated in response to said CPU means to store a plurality of indicators, including a receive or transmit mode indicator and an analog or digital mode indicator;
receiving means connected to said clock means, to said mode control means, to said terminal equipment and to said CPU means via said bus means, said receiving being operated in response to said clock means to transfer said CCIS data words from said connected analog and digital terminal equipment to said CPU means; and
transmitting means connected to said CPU means via said bus means, to said clock means, to said mode control means and to said terminal equipment, said transmitting means being operated in response to said clock means to transfer said CCIS data words from said CPU means to said analog and to said digital terminal equipment.

2. A terminal equipment control circuit as claimed in claim 1, wherein there is further included decoding means connected to said CPU means, to said mode control means and to said transmitting means, said decoding means being operated in response to said CPU means to produce a plurality of enabling signals, including a first enabling signal, a second enabling signal, a third enabling signal and a bus control enabling signal.

3. A terminal equipment control circuit as claimed in claim 2, said CPU means including microprocessor means.

4. A terminal equipment control circuit as claimed in claim 3, said bus control means including transceiver means connected to said microprocessor means, to said bus means and to said decoding means, said transceiver means being operated in response to said bus control enabling signal to connect said microprocessor means to said bus means.

5. A terminal equipment control circuit as claimed in claim 4, said clock means connected to said receiving and transmitting means, said clock means being operated to produce an analog clock signal, a digital clock signal, a 20-bit count signal and a 28-bit count signal.

6. A terminal equipment control circuit as claimed in claim 5, said receiving means including:
first gating means connected to said mode control means, to said clock means and to said terminal equipment, said first gating means being operated in response to said receive indicator and to said digital mode indicator to transmit said digital clock signal and to transmit said CCIS data word;
multiplexing means connected to said terminal equipment, to said first gating means and to said mode control means, said multiplexing means being operated in response to said receive mode indicator and to said analog mode indicator to transmit said analog clock signal and said CCIS data word, said multiplexing means being further operated in response to said receive mode indicator and to said digital mode indicator to transmit said digital clock signal and said CCIS data word; and second gating means connected to said multiplexing means, to said receiving means and to said clock means, said second gating means being operated in response to said 20-bit count signal to transmit said CCIS data word to said receiving means.

7. A terminal equipment control circuit as claimed in claim 6, wherein there is further included cyclic redundancy checking means connected to said second gating means and to said bus means, said cyclic redundancy checking means being operated to transmit an error indication to said CPU means for an error in reception of said CCIS data words from said terminal equipment.

8. A terminal equipment control circuit as claimed in claim 7, said receiving means further including:
shift register means connected to said multiplexer means and to said second gating means, said shift register means being operated to receive and to store 20-bits of said CCIS data word;
buffering means connected to said shift register means, to said bus means and to said clock means, said buffering means being operated in response to said 20-bit count signal to store said 20-bit CCIS data word; and
said microprocessor means being operated to read said 20-bit CCIS data word from said buffering means.

9. A terminal equipment control circuit as claimed in claim 8, said shift register means including a plurality of shift registers, including a first shift register, at least one intermediate shift register and a last shift register, said first shift register being connected to said second gating means, an output of said first shift register being connected to an input of said intermediate shift register, an input of each succeeding intermediate shift register being connected to an output of said preceding intermediate shift register, an input of said last shift register being connected to an output of said last succeeding intermediate shift register.

10. A terminal equipment control circuit as claimed in claim 9, said buffering means further including a plurality of buffers, each buffer being connected to a corresponding shift register, to said clock means and to said bus means.

11. A terminal equipment control circuit as claimed in claim 5, said transmitting means including:
buffering means connected to said bus means and to said decoding means, said buffering means being operated in response to said first, second and third enabling signals to store a 20-bit CCIS data word; and
shift register means connected to said buffering means and to said clock means via said 20-bit count signal, said shift register means being operated in response to said 20-bit count signal to transmit said 20-bit CCIS data word in bit serial form.

12. A terminal equipment control circuit as claimed in claim 11, said buffering means including a plurality of buffers, each buffer being connected to said bus means and to said decoding means, said plurality of buffers including a first buffer being operated in response to said first enabling signal, an intermediate buffer being operated in response to said second enabling signal and a third buffer being operated in response to said third enabling signal.

13. A terminal equipment control circuit as claimed in claim 12, said shift register means including a plurality of shift registers, connected to said corresponding ones of said plurality of buffers, said plurality of shift registers including a first shift register, at least one intermediate shift register and a last shift register, an output of said first shift register being connected to an input of one said intermediate shift register, an input of said next exceeding intermediate shift register being connected to an output of said previous intermediate shift register and an input of said last shift register being connected to an output of said last succeeding intermediate shift register.

14. A terminal equipment control circuit as claimed in claim 13, said transmitting means further including cyclic redundancy check generating means connected to said clock means and to an output of said last shift register, said cyclic redundancy check generating means being operated in response to said 20-bit count signal and to said 28-bit count signal to generate and to transmit cyclic redundancy check data.

15. A terminal equipment control circuit as claimed in claim 14, said transmittting means further including gating means connecting to said cyclic redundancy check generating means, to said terminal equipment and to said mode control means, said gating means being operated in response to said mode control means to transmit analog data to an analog terminal equipment and to transmit digital data to digital terminal equipment.

16. A terminal equipment control circuit as claimed in claim 15, said gating means including:
   inverting means connected to said mode control means;
   first AND gating means connected to said analog terminal equipment, to said inverting means and to said cyclic redundancy check generating means, said first AND gating means being operated to transmit said CCIS data word to said analog terminal equipment; and
   second AND gating means connected to said mode control means, to said digital terminal equipment and to said cyclic redundancy check generating means, said second AND gating means being operated to transmit said CCIS data word to said digital terminal equipment.

17. A terminal equipment control circuit as claimed in claim 6, said first gating means including:
   first AND gating means connected to a digital terminal equipment and to said mode control means; and
   second AND gating means connected to said first AND gating means, to said clock and to said multiplexing means.

18. A terminal equipment control circuit as claimed in claim 6, said second gating means including an EXCLUSIVE-OR gate.

* * * * *